United States Patent
Callanan et al.

(10) Patent No.: US 7,970,850 B1
(45) Date of Patent: Jun. 28, 2011

(54) INSTANT MESSAGING BASED VIRTUAL FILE SYSTEM

(75) Inventors: Sean Callanan, Dublin (IE); Carol S. Zimmet, Boxboro, MA (US); Fred Raguillat, Dunboyne (IE); Patrick Joseph O'Sullivan, Dublin (IE); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/648,586

(22) Filed: Dec. 29, 2009

(51) Int. Cl.
*G06F 15/16* (2006.01)
*G06F 15/173* (2006.01)

(52) U.S. Cl. ........ 709/207; 709/206; 709/224; 709/226; 707/100

(58) Field of Classification Search .......... 709/203, 709/206, 207, 224, 226; 707/100
See application file for complete search history.

(56) References Cited

U.S. PATENT DOCUMENTS

| | | | |
|---|---|---|---|
| 7,080,139 B1 * | 7/2006 | Briggs et al. | 709/224 |
| 7,526,483 B2 | 4/2009 | Samji | |
| 7,792,967 B2 * | 9/2010 | Jones et al. | 709/226 |
| 7,870,215 B1 * | 1/2011 | Groves et al. | 709/207 |
| 2003/0014477 A1 * | 1/2003 | Oppenheimer et al. | 709/203 |
| 2007/0162589 A1 | 7/2007 | Riddle | |
| 2008/0016218 A1 * | 1/2008 | Jones et al. | 709/226 |
| 2008/0120387 A1 * | 5/2008 | Werndorfer et al. | 709/206 |

OTHER PUBLICATIONS

"HyLighter—Share & Grow", downloaded from https://www.hylighter.com/hylighter/website/docs.html on Dec. 29, 2009, p. 1.
Lotus Connections File Sharing User Interface, screenshot, Dec. 4, 2009, p. 1.
"About Google Wave", downloaded from http://wave.google.com/help/wave/about.html on Dec. 29, 2009, p. 1.

\* cited by examiner

*Primary Examiner* — Khanh Q Dinh
(74) *Attorney, Agent, or Firm* — David A. Dagg (57) ABSTRACT

An instant messaging system generates an instant messaging application user interface display object enabling the user to select one or more buddies, or a predefined group from their buddy list, and then to select a file to share with the selected buddies or group. The instant messaging system then controls sharing of the file within the selected buddies or group, by allowing only one of the sharing users to check out and modify the shared document at a given time. The instant messaging system user interface displayed to each user also displays the list of files that are shared with that user. The instant messaging system user interface further provides a current status for each shared file, including an indication of one of the sharing users that currently has the shared file checked out.

17 Claims, 4 Drawing Sheets

INSTANT MESSAGING BASED VIRTUAL FILE SYSTEM

FIELD OF THE INVENTION

The present invention relates generally to instant messaging and/or collaboration systems, and more specifically to a method and system for providing an instant messaging based virtual file system.

BACKGROUND OF THE INVENTION

As it is generally known, instant messaging (IM) systems are often used as a pivotal tool in modern collaborative work environments. Instant messaging applications allow geographically dispersed groups of users to work together, while creating and sharing documents and artifacts. Teams of business users come together through the instant messaging application, as an alternative or supplement to using electronic mail applications, in order to work on a common task. However, in existing systems, members of a work team that interact using instant messaging while sharing a document can quickly get into a situation in which no one knows which team member has the latest version of the document.

In previous systems, individuals have been allowed to attach a file to an instant message, and thus send the file to one or more of their instant messaging buddies. After the file is sent through such existing systems, it goes out of the sending user's control. In some situations, file sharing has been provided at the operating system level, or in a Web oriented storage application or service, such as the DropBox system provided by DropBox, Inc., or the Cattail Web Site developed by International Business Machines Corporation. While these existing systems do provide file sharing across geographically dispersed users, they operate outside the preferred, primary collaboration environment of instant messaging, and accordingly require extra work to manage control over who can access the shared resources and who controls them at any given time.

It would therefore be desirable to have a new automated solution that effectively supports sharing of files through an instant messaging system.

SUMMARY OF THE INVENTION

To address the above described and other shortcomings of previous systems, a solution is disclosed that supports sharing of files through an instant messaging system by providing an instant messaging based virtual file system. In the disclosed system, the instant messaging system generates an instant messaging application user interface display object enabling the user to select a group of sharing users from the buddies in their buddy list, and to then select a file to share with the group. The instant messaging system controls sharing of the file within the sharing group, for example by allowing only one of the sharing users to check out and modify the shared document at a time.

The disclosed instant messaging system user interface displayed to each sharing user displays the list of files that are shared with that user. The instant messaging system user interface further provides a current status for each shared file, such as an indication of one of the sharing users that currently has the shared file checked out (i.e. the current "owner" of the shared file). In one embodiment, the instant messaging system also maintains a chat history for each shared file, storing the update history of the file. The chat history for a given shared file may also be made accessible to the sharing users through the instant messaging user interface.

While the disclosed instant messaging system has checked out a shared file to one of the sharing users, in one embodiment, each of the other users sharing the file are still allowed to access a read-only, local copy of the shared file on their client computer systems.

The disclosed instant messaging system may also be embodied to provide notifications to each of the sharing users indicating whether their local copy of the shared is currently up to date (i.e. whether their local copy includes the most recently checked-in modifications). Such notifications may, for example, be generated in response to a sharing user checking the file back in.

In another embodiment, the user that initially shared the document through the instant messaging system is considered the "author of the document, and is provided with special privileges with regard to the shared document. For example, the disclosed instant messaging system may allow only the author of a shared file to delete the shared file. The author of a shared document may further be allowed to designate specific access rights (e.g. read, copy, modify, delete) granted to specific other ones of the sharing users with regard to the shared file, and/or specific access rights granted to instant messaging clients of specific vendors with regard to the shared file.

The disclosed system provides significant advantages over previous systems. These advantages include allowing instant messaging users to quickly and easily collaborate on files in their preferred collaborative work environment. Users of the disclosed system can share files without having to map their instant messaging buddies or collaboration groups into another system. The disclosed system enables file sharing without incurring additional costs from storing files on external systems. The disclosed system conveniently manages the collaboration context, and manages the synchronization of updates across the sharing group. The disclosed system also manages the current state of the shared resource, automatically making each sharing user aware of which sharing user is currently in control of the resource at any given time.

Thus there is disclosed an automated solution that effectively supports sharing of files through an instant messaging system.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
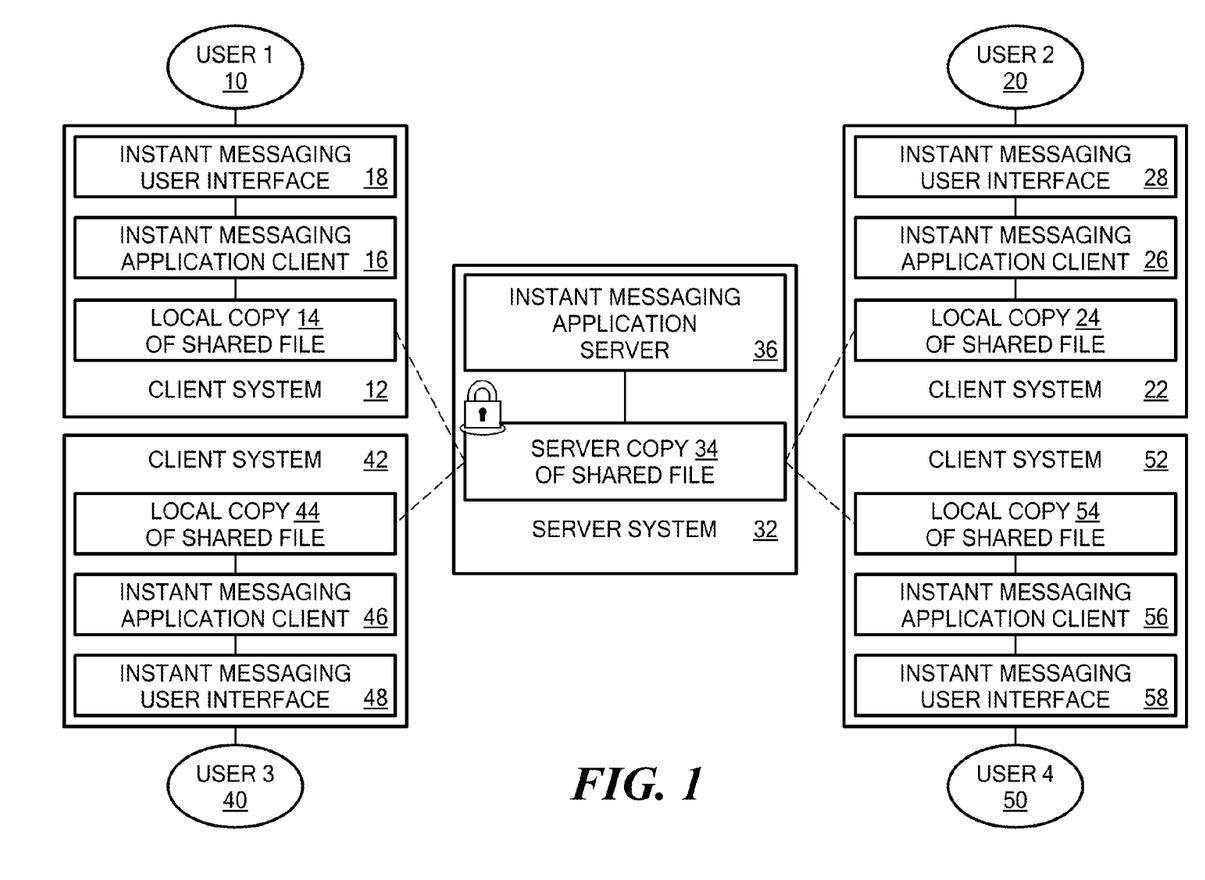
FIG. 1 is a block diagram showing components in an illustrative embodiment of the disclosed system.

FIG. 1 is a block diagram showing hardware and software components in an illustrative embodiment of the disclosed system. As shown in FIG. 1, User 1 10 is associated with a Client System 12, which may include a Local Copy 14 of a shared file, and an Instant Messaging Application Client 16. The Instant Messaging Application Client 16 generates an Instant Messaging User Interface 18.

User 2 20 is associated with a Client System 22, which may include Local Copy 24 of the shared file, and an Instant Messaging Application Client 26. The Instant Messaging Application Client 26 generates Instant Messaging User Interface 28.

User 3 40 is associated with a Client System 42, which may include Local Copy 44 of the shared file, and an Instant Messaging Application Client 46. The Instant Messaging Application Client 46 generates Instant Messaging User Interface 48.

User 4 50 is associated with a Client System 52, which may include Local Copy 54 of the shared file, and an Instant Messaging Application Client 56. The Instant Messaging Application Client 56 generates Instant Messaging User Interface 58.

The illustrative embodiment of FIG. 1 further shows a Server System 32, including an Instant Messaging Application Server 36, and storing a Server Copy 34 of the shared file, also referred to herein for purposes of explanation in the embodiment of FIG. 1 as the "master copy" of the shared file.

During operation of the embodiment shown in FIG. 1, and as further described below, the disclosed system supports sharing of files among a group of sharing users, such as, for example, the sharing group including User 1 10, User 2 20, User 3 40 and User 4 50. In the disclosed system, the Instant Messaging User Interfaces 18, 28, 48, and 58 contain or expose user display objects enabling each of the respective Users 10, 20, 40 and 50 to perform file sharing actions such as submitting a file to be shared, indicating which other users the submitted file is to be shared with, and indicating the specific access privileges each sharing user and/or each non-sharing user is to be provided with regard to the shared file.

For purposes of explanation herein, a user submitting a file to be shared through one of the Instant Messaging User Interfaces 18, 28, 48, and 58, may sometimes be referred to as the "author" user with regard to the shared file. The author user is provided with user interface display objects (e.g. drag-and-drop targets, menus, check boxes, text entry fields, etc.) within the instant messaging user interface enabling the author user to select each sharing user to be included in the sharing group for submitted file, and to indicate the specific access privileges to be granted to each sharing user. For example, the author user may be provided with user interface display objects enabling the author user to indicate which of the sharing users is permitted to read the shared file, which of the sharing users is permitted to modify the shared file, and/or which of the sharing users is permitted to delete the shared file.

The author user may further be provided with user interface display objects enabling the author user to indicate specific types of information regarding the shared file the disclosed system will make accessible to users that are not members of the sharing group. For example, the disclosed system may be embodied to provide the author user of a shared file with user interface display objects enabling the author user to indicate whether all or individually specified users outside the file's sharing group are allowed to perform specific actions with regard to the shared file, such as, for example, view the contents of the shared file, view information regarding the last change made to the file, view the total number of changes made to the file, and/or view a chat history including entries describing each change made to the file, such as the time and date at which each change was made to the file and the identities of the users making each change.

In addition, the disclosed system may be embodied such that the author user is provided with user interface display objects enabling the author user to assign access rights with regard to the shared file based on the type or providing vendor of the instant messaging client used by another user that is attempting to access the file. For example, in one embodiment, the author user is provided with user interface display objects enabling the author user to indicate that sharing users using an instant messaging client provided by a first vendor (e.g. those users chatting through a Gmail™ client) have a first set of access rights with regard to the shared file (e.g. read-only rights), while users that use an instant messaging client provided by a second vendor (e.g. those users chatting though an AIM™ client) have a second set of access rights with regard to the shared file (e.g. read and modify rights).

After a file has been submitted for sharing through the Instant Messaging User Interfaces 18, 28, 48, and 58, the disclosed system stores the master copy of the shared file. For example, in the client-server embodiment shown in FIG. 1, if User 1 10 submits a file for sharing, the shared file may be conveyed by the Instant Messaging Application Client 16 to the Instant Messaging Application Server 36, and the Instant Messaging Application Server 36 stores a master copy of the shared file (i.e. Server Copy 34) on a server controlled storage device (e.g. non-volatile storage).

The disclosed system further operates to distribute shared file information regarding the shared file to the client systems of the sharing users. For example, if User 1 10 submits a file for sharing, the Instant Messaging Application Server 36 may distribute the name or other identifier of the shared file to the instant messaging application clients associated with each of the other sharing users. As a result, each of the Instant Messaging User Interfaces 18, 28, 48, and 58 can then be modified or updated by their respective instant messaging application clients to display the name of the shared file to the associated sharing users, for example within a list of shared files displayed to each user and including indications of all files currently shared within the sharing group.

In one embodiment, the shared file information distributed to the instant messaging application clients of the sharing users may include a copy of the shared file, allowing each instant messaging application client to store a local copy of the shared file, shown in FIG. 1 by the Local Copies 14, 24, 44 and 54 of the shared file. For example, copies of the shared file may automatically be conveyed from the Instant Messaging Application Server 36 in the Server System 32 to some or all of the Instant Messaging Application Clients 16, 26, 46 and 56 in the Client Systems 12, 22, 42 and 52 of the sharing users when the author user initially shares the file, and then subsequently in response to modifications being made to the file, such as in response to a sharing user checking the file back in after having checked the shared file out and edited the shared file.

The disclosed system may be embodied such that copies of the shared file are not automatically conveyed to the client systems of the users sharing the file. In such an alternative embodiment, an indication that the shared file has been modified may be broadcast to the sharing users from the Server System 32 when the shared file is modified, for example when one of the sharing users checks the shared file back in after having edited it. Responsive to receiving an indication that the master copy of a shared file has been modified since the last time a local copy of the file was received and stored, the receiving instant messaging application client may operate to provide a visual indication to the associated sharing user that the local copy of the shared file is not up to date. Such a visual indication may include changing the way the entry for the shared file is displayed within a shared file list contained in the instant messaging user interface, or some other specific indication. In one embodiment, individual sharing users are provided with the ability to control preference settings that indicate to the disclosed system whether copies of the shared file are to be automatically conveyed to specific client systems or not.

If modified versions of the shared file are not automatically provided to a client system of a sharing user, the disclosed system may be embodied to generate a user interface display object through which a sharing user can expressly request that a new copy of the shared file be conveyed to their client system so that they will have an up to date version of the file.

The disclosed may also be embodied such that local copies of shared files are not distributed until a local user opens a shared file, at which time the latest version of the master copy of the shared file is conveyed to that user's client system. In the case where the user opens up a read-only copy of the shared file without checking the file out, information regarding whether the file is currently checked out and the identity of any user that currently has the file checked out is also provided.

After a file has been submitted for sharing, the disclosed system ensures that only one of the sharing users can check the shared file out at a time. The user having currently checked out a shared file may be referred to herein for purposes of explanation as the current "owner" of the file. Only the current owner of a shared file is allowed to make edits to the file. When the owner checks the file back in through the instant messaging user interface, the disclosed system replaces the previous master copy of the shared file with the edited version.

In one embodiment, when a user checks out a shared file, the disclosed system operates to distribute the name or other identifier of the user that has checked out the file to the client systems of each user sharing the file. Upon receipt of such identifying information, each instant messaging client may operate to modify a representation of the shared file within the instant messaging user interface (e.g. within a shared files list) to include a display of the name or identifier of the user that currently has the shared file checked out. When the owning user checks the shared file back in, the disclosed system conveys an indication that the file has been checked back in to each of the sharing users' client systems, so that the representation of the shared file in each shared file list can be modified to show that the file is no longer checked out.

The disclosed system may further be embodied such that a chat history is maintained for each shared file, containing entries describing the specific check out/check history for the shared file, where each time the shared file is checked out an entry is added to the chat history, and each entry includes an identifier of the user that checked the file out, and the times and data when the file was checked out and checked back in.

Those skilled in the art will recognize that while the embodiment of FIG. 1 uses a client-server implementation, the disclosed system may alternatively be embodied using a peer-to-peer architecture, in which no server system is required. In such an alternative embodiment, any master copy of a shared copy is stored on one of the client systems of the sharing users (e.g. the client system of the author user), and operations described above as being performed by the Server System 32 and/or the Instant Messaging Application Server 36 are performed in one or more of the instant messaging application clients of the sharing users. In one peer-to-peer embodiment, a software add-on such as a "plug-in" is used to provide some or all of the functions of the disclosed system. In such an embodiment, different plug-ins may be developed for each specific type of instant messaging application client, allowing for operation of the disclosed system across different instant messaging client vendors. Additionally, such a peer-to-peer embodiment advantageously obviates any need to modify the application servers involved.

While for purposes of concise illustration only four sharing users and associated client systems are shown in FIG. 1, those skilled in the art will recognize that the disclosed system may be embodied such that any specific number of sharing users may share one or more files using the disclosed system. Similarly, while for purposes of concise illustration only one server system is shown in FIG. 1, the disclosed system may be embodied such that any specific number of server systems are used to perform the operations described in association with the Server System 32.

The Client Systems 12, 22, 42 and 52 of FIG. 1 may include any specific type of a computer system and/or intelligent electronic device, such as a desktop, laptop, or palmtop computer system, or a personal digital assistant, cell phone, and/or other electronic device. Each of the Client Systems 12, 22, 42 and 52 may include or control a display device that is capable of displaying a graphical user interface including a respective one of the Instant Messaging User Interfaces 18, 28, 48 and 58, to the associated one of the Users 10, 20, 40 and 50, such as a liquid crystal display (LCD), cathode ray tube (CRT), interferometric modulator display (IMOD), light emitting diode (LED), or the like.

Those skilled in the art will recognize that the Instant Messaging Application Clients 16, 26, 46 and 56 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client Systems 12, 22, 42 and 52 may each include one or more processors, and program storage, such as memory, for storing program code executable on such processors (e.g. Instant Messaging Application Clients 16, 26, 46 and 56, and/or other application and/or operating system program code), as well as other input/output devices and/or other external interfaces.

Server System 32 may also be embodied as any specific type of computer system including one or more processors, and program storage, such as memory, for storing program code executable on such processors (e.g. Instant Messaging Application Server 36, and/or other application and/or operating system program code), as well as for storing data and/or databases or the like such as Server Copy 34 of one or more shared files. Server System 32 may further include a number of input/output devices and/or other external interfaces. Those skilled in the art will further recognize that Instant Messaging Application Server 36 may also be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware.

The Client Systems 12, 22, 42 and 52 and Server System 32 may be communicably connected using any specific kind of data communication network and/or protocol.

Figure 2:
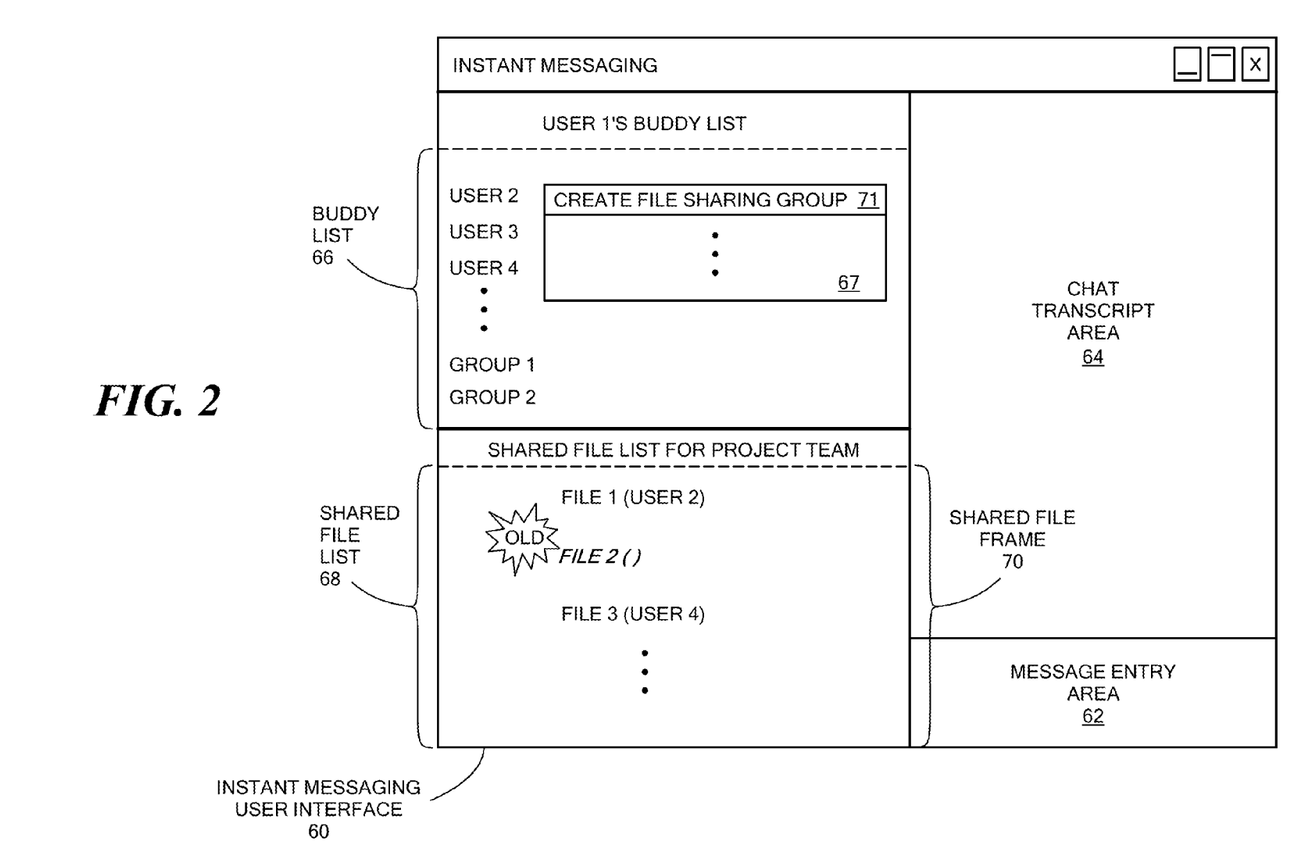
FIG. 2 is a simplified screen shot showing a user interface generated by an illustrative embodiment of the disclosed system.

FIG. 2 is a simplified screen shot showing a user interface generated by an illustrative embodiment of the disclosed system. FIG. 2 shows an Instant Messaging User Interface 60, which is an example of the Instant Messaging User Interfaces 18, 28, 48 and 59 shown in FIG. 1. The Instant Messaging User Interface 60 includes a Message Entry Area 62 enabling the user to enter text or other content to be added to an instant messaging session, as well as a Chat Transcript Area 64 that enables the user to view the contents of a current or previous instant messaging session. The Chat Transcript Area 64 can also be used to view a chat history generated by an embodiment of the disclosed system and containing entries representing the modification history of an associated shared file.

The Instant Messaging User Interface 60 is further shown including a Buddy List 66. The Buddy List 66 is a list of screen names or other identifiers of other users that the local user can communicate with through the instant messaging application. The Buddy List 66 may further include the names of one or more groups of users (i.e. group names). In one embodiment, double-clicking on any screen name in the Buddy List 66 will open an instant messaging session with the corresponding user, or with all the users in the group, and allow the local user to begin entering messages into the session.

The Instant Messaging User Interface 60 enables the user to share files with other users through the Shared File Frame 70. A user display interface display object, such as a button, menu item, etc., is contained within or exposed through the Instant Messaging User Interface 60 that enables the user to initially cause the Shared File Frame 70. For example, in one embodiment, prior to any files being shared, the Shared File Frame 70 is not displayed. When a user first decides to share a file, the user right clicks somewhere in the Buddy List 66, for example on one of the screen names in the Buddy List 66. In response, the disclosed system generates a Context Menu 67 or the like, that includes a user selectable menu item for sharing files, such the menu item 71 ("Create File Sharing Group"). When the user initially selects the menu item 71 or the like, the disclosed system generates the Shared File Frame 70. The Shared File Frame 70 is a drag-and-drop area, such that user can then drag and drop screen names and/or group names from the Buddy List 66 into the Shared File Frame 70 to create a sharing user group. The user can also drag and drop file names or icons from the virtual desktop or another application into the Shared File Frame 70 to submit files for sharing with the sharing user group. In the example of FIG. 2, the files shared among members of a sharing group referred to as the "Project Team" are displayed in the Shared File List 68. Those files are shown including File 1, File 2, and File 3.

In one embodiment, the list entries for each file in the Shared File List 68 may display information about the file including whether a file is currently checked out, the identity of any sharing user that currently has the file checked out, and/or whether a local copy of the shared file is the most recent version of the shared file. For example, in the illustrative embodiment of FIG. 2, if a shared file is currently checked out, the screen name of the user that has the file checked out is displayed in parenthesis after the file name. Accordingly, File 1 is currently checked out by User 2, File 2 is not currently checked out, and File 4 is currently checked out by User 4.

The format of each file name in the Shared File List 68 also indicates whether the local copy of the shared file is the most recent version. In the example of FIG. 2, if a local copy of a file is not the most recent version, then the name of that file in the Shared File List 68 is displayed in italics with an adjacent star burst containing the word "OLD". Any other specific technique may be used alternatively or in addition to indicate to the user through the Shared File List 68 that a local copy of a shared file is not up to date.

While the Shared File List 68 shows the files shared with a single group of users (i.e. the "Project Team"), the disclosed system is not so limited. For example, the Shared File Frame 70 may display multiple shared file lists, each one displaying the files shared with a corresponding sharing group of users. Additionally, while for purposes of illustration a context menu entry is shown in FIG. 3 for initiating creation of the Shared File Frame 70, and while a drag-and-drop area is shown for enabling a user to select users to be added to a sharing group and enabling a user to submit files for sharing with a sharing group, any other specific type of user interface object or technique may be used in the alternative for these functions within the Instant Messaging User Interface 60, as may be appropriate for a given application or configuration.

Figure 3:
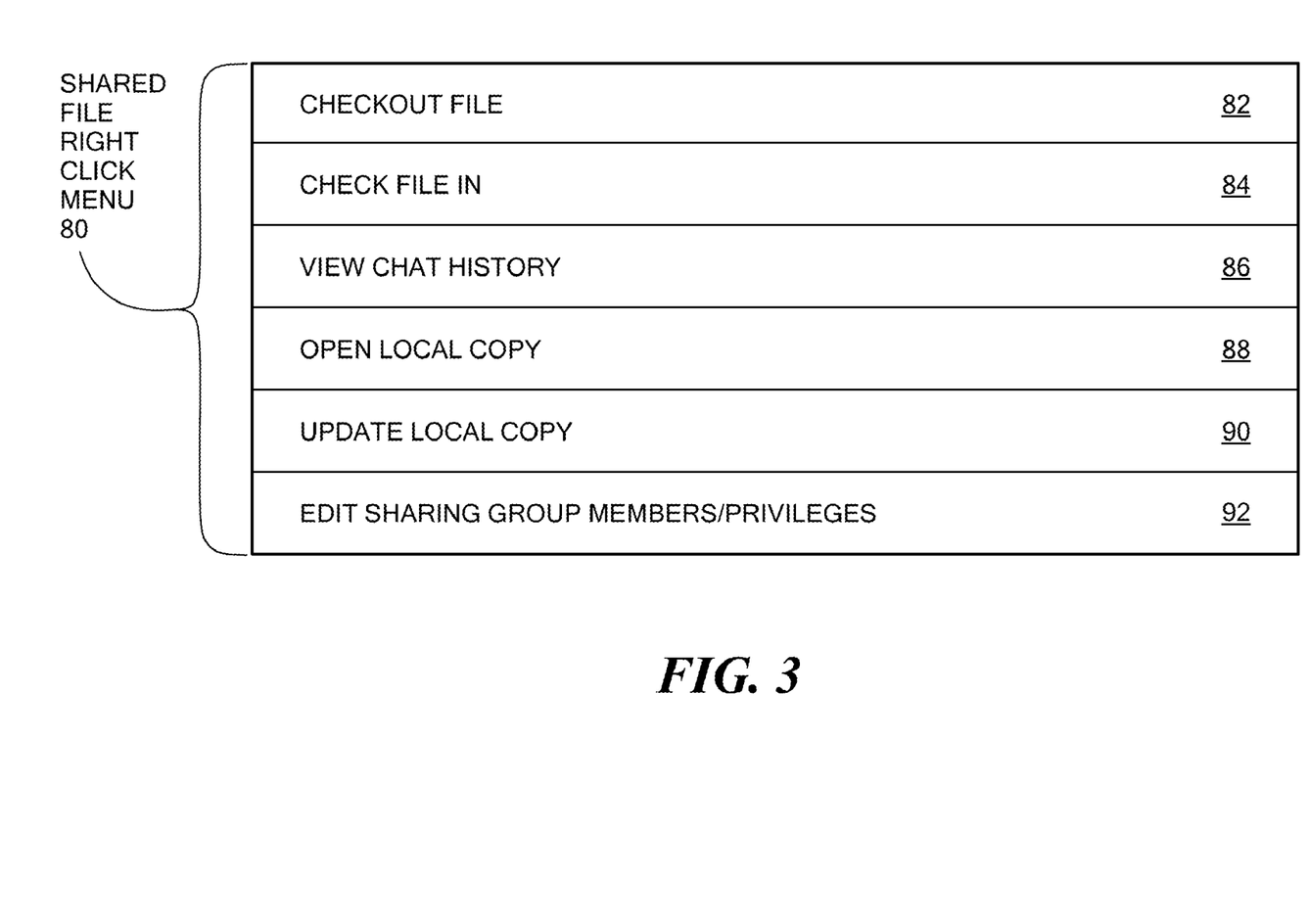
FIG. 3 is an example of a context menu generated in a user interface of an illustrative embodiment of the disclosed system.

FIG. 3 is an example of a context menu generated in a user interface of an illustrative embodiment of the disclosed system. The Shared File Right Click Menu 80 is a context menu generated by an embodiment of the disclosed system in response to a user right clicking on one of the file names listed in the Shared File List 68. The Shared File Right Click Menu 80 includes a number of user selectable menu items, including a Checkout File menu option 82. When the user selects the Checkout File menu option 82, the disclosed system operates to determine if the file that was right clicked on is currently checked out.

When the user selects the Check File In menu option 84, the disclosed system operates to allow the user to check in a modified version of the file that was right clicked on, and to add comments into a chat history maintained for the file describing the modifications made to the file.

When the user selects the View Chat History menu option 86, the disclosed system displays (e.g. within the Chat Transcript Area 64) a chat history maintained by the disclosed system for the file that was right clicked on, including an entry for each time the file was checked out, where the entries contain information such as, for example, which user checked the file out, when the file was checked out, when the file was checked in, and any comments entered by the use that checked the file out when the file was checked back in.

When the user selects the Open Local Copy menu option 88, the disclosed system operates to open a read-only copy of the shared file that was right clicked on as a local copy stored on the user's client computer system, without checking the shared file out.

When the user selects the Update Local Copy menu option 90, the disclosed system operates to update a local copy of the shared file that was right clicked on stored on user's client computer system with the latest version of the master copy of the shared file, including all checked-in modifications.

And when the user selects the Edit Sharing Group Members/Privileges 92, the disclosed system generates one or more user interface display objects (e.g. a list of the users in the sharing user group for the shared file that was right clicked on) that allows the user to delete/remove users from the sharing group, and/or to modify the access privileges of specific sharing users with regard to the shared file that was right clicked on. In an embodiment in which the author user is the only sharing user allowed to set or modify the access privileges of sharing users with regard to the shared file, the menu item 92 may only be displayed to the author user.

Figure 4:
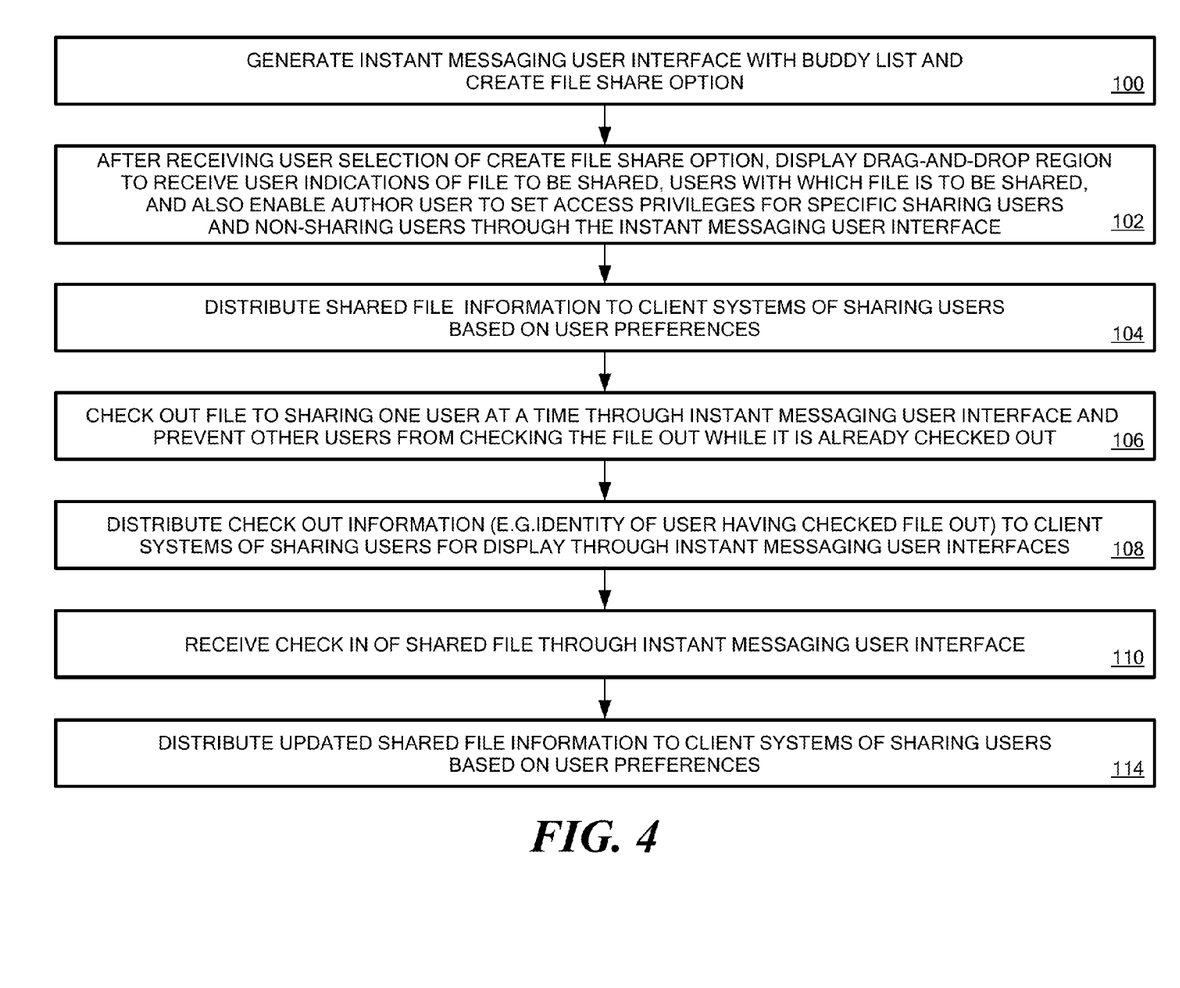
FIG. 4 is a flow chart showing steps performed during operation of an illustrative embodiment of the disclosed system.

FIG. 4 is a flow chart showing steps performed during operation of an illustrative embodiment of the disclosed system. The steps of FIG. 4 may, for example, be performed by one or more of the Instant Messaging Application Clients 16, 26, 46 or 56, and/or the Instant Messaging Application Server 36 of FIG. 1.

At step 100, the disclosed system generates an instant messaging user interface (e.g. Instant Messaging User Interface 60), with a buddy list (e.g. Buddy List 66) and a create file share option (e.g. menu option 72 in FIG. 2). At step 102, after receiving user selection of the create file share option, the disclosed system displays a user interface object (e.g. Shared File Frame 70) to receive user indications of one or more files to be shared, and of the users to be included in the sharing group. Further at step 102, the disclosed system operates to enable the user submitting the file or files to be shared (i.e. the author user) to set access privileges with regard to the shared file for specific users within the sharing group, and/or for all users not within the sharing group, through the instant messaging user interface.

At step 104, the disclosed system distributes shared file information to the client systems of the users in the sharing group, based on user preferences. For example, some of the users in the sharing group may have user preference settings indicating that copies of the shared file should automatically be forwarded to their client systems, while other users in the sharing group may have user preference settings indicating that copies of the shared file should only be forwarded to them when the open or otherwise request the shared file.

At step 106, the disclosed system checks out the shared file to one of the users in the sharing group through the instant messaging user interface. While the shared file is checked out, the disclosed system operates to prevent any other users from checking the file out.

At step 108, the disclosed system distributes check out information (e.g. the name of the user having checked out the file in step 106) to client systems of all the sharing users, so that the name of the user having checked out the file can be displayed or exposed through the instant messaging application user interface.

At step 110, the disclosed system receives a check in of the file that was checked out at step 108. The disclosed system may also at step 110, receive a text comment or the like entered by the user that checked the file in, and enter the comment into a chat history maintained for the check in file and reflecting all the modifications made to the file.

And at step 114, the disclosed system distributes updated information regarding the shared file, such as the latest version of the shared file including any modifications to the shared file that were checked in at step 110, or an indication that the file has been modified, to one or more client systems of the users in the sharing group, depending on the specific user preferences of individual users.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system comprising:
at least one processor and at least one computer readable memory, said computer readable memory having stored thereon program code for providing an instant messaging based virtual file system, said program code including:
program code for generating, within an instant messaging system user interface, a display object for receiving, through said instant messaging system user interface, an indication from a local user of a plurality of sharing users made up of instant messaging buddies selected by said local user from a buddy list displayed in said instant messaging system user interface;
program code for generating, within said instant messaging system user interface, a display object for receiving, through said instant messaging system user interface, an indication from said local user of at least one file to be shared among said plurality of sharing users;
program code for generating, within said instant messaging system user interface, a display object enabling only one of said plurality of sharing users to check out said file at a time;
program code for allowing only said one of said plurality of sharing users having checked out said file to modify said file;
program code for distributing copies of said file to each of said plurality of sharing users to be stored as local copies of said file;
program code for allowing read access to said local copies of said file to ones of said sharing users not currently having said file checked out;
program code for distributing, to each of said plurality of sharing users, indications of whether said local copies of said file are currently up to date; and
program code for displaying, within said list of shared files in said instant messaging system user interface, visual indications of whether local copies of said shared files in said list are currently up to date.

2. The system of claim 1, said program code further comprising:
program code for generating, within said instant messaging system user interface, a list of shared files, wherein said list of shared files indicates each of a plurality of files shared with said local user through said instant messaging system.

3. The system of claim 2, said program code further comprising:
program code for displaying, within said list of shared files in said instant messaging system user interface, a visual indication identifying which users currently have checked out respective ones of said plurality of files shared with said local user through said instant messaging system.

4. The system of claim 1, said program code further comprising:
program code for receiving, from said local user through said instant messaging system user interface, an identifier of a predetermined group of buddies to make up said plurality of sharing users that said at least one file is to be shared with.

5. The system of claim 1, said program code further comprising:
program code for maintaining a chat session history for each file shared through said instant messaging system, said chat session history made up of entries indicating each action performed on the corresponding shared file.

6. The system of claim 5, said program code further comprising:
program code for allowing each of said plurality of sharing users to access said chat session history for each shared file.

7. The system of claim 6, said program code further comprising:
program code for storing, in said chat session history, indications of check out and check in actions performed on said corresponding shared file, wherein said indications of each check out and check in actions include the identities of the sharing users performing said check out and check in actions, times and dates at which said check out and check in actions were performed, and specific modifications to said file performed on said shared file.

8. The system of claim 1, said program code further comprising:

program code for enabling said local user indicating said file to be shared among said plurality of sharing users, through said instant messaging system user interface, to indicate specific access rights for individual ones of said plurality of sharing users with respect to said shared file.

9. A method embodied in at least one computer system for providing an instant messaging based virtual file system, including steps performed by said computer system comprising:

generating, within an instant messaging system user interface, a display object for receiving, through said instant messaging system user interface, an indication from a local user of a plurality of sharing users made up of instant messaging buddies selected by said local user from a buddy list displayed in said instant messaging system user interface;

generating, within said instant messaging system user interface, a display object for receiving, through said instant messaging system user interface, an indication from said local user of at least one file to be shared among said plurality of sharing users;

generating, within said instant messaging system user interface, a display object enabling only one of said plurality of sharing users to check out said file at a time;

allowing only said one of said plurality of sharing users having checked out said file to modify said file;

distributing copies of said file to each of said plurality of sharing users to be stored as local copies of said file;

allowing read access to said local copies of said file to ones of said sharing users not currently having said file checked out;

distributing, to each of said plurality of sharing users, indications of whether said local copies of said file are currently up to date; and displaying, within said list of shared files in said instant messaging system user interface visual indications of whether local copies of said shared files in said list are currently up to date.

10. The method of claim 9, further comprising:

generating, within said instant messaging system user interface, a list of shared files, wherein said list of shared files indicates each of a plurality of files shared with said local user through said instant messaging system.

11. The method of claim 10, further comprising:

displaying, within said list of shared files in said instant messaging system user interface, a visual indication identifying which users currently have checked out respective ones of said plurality of files shared with said local user through said instant messaging system.

12. The method of claim 9, further comprising:

receiving, from said local user through said instant messaging system user interface, an identifier of a predetermined group of buddies to make up said plurality of sharing users that said at least one file is to be shared with.

13. The method of claim 9, further comprising:

maintaining a chat session history for each file shared through said instant messaging system, said chat session history made up of entries indicating each action performed on the corresponding shared file.

14. The method of claim 13, further comprising:

allowing each of said plurality of sharing users to access said chat session history for each shared file.

15. The method of claim 14, further comprising:

storing, in said chat session history, indications of check out and check in actions performed on said corresponding shared file, wherein said indications of each check out and check in actions include the identities of the sharing users performing said check out and check in actions, times and dates at which said check out and check in actions were performed, and specific modifications to said file performed on said shared file.

16. The method of claim 9, further comprising:

enabling said local user indicating said file to be shared among said plurality of sharing users, through said instant messaging system user interface, to indicate specific access rights for individual ones of said plurality of sharing users with respect to said shared file.

17. A computer program product comprising:

a non-signal computer readable storage medium having stored thereon program code for providing an instant messaging based virtual file system, said program code including program code for generating, within an instant messaging system user interface, a display object for receiving, through said instant messaging system user interface, an indication from a local user of a plurality of sharing users made up of instant messaging buddies selected by said local user from a buddy list displayed in said instant messaging system user interface;

program code for generating, within said instant messaging system user interface, a display object for receiving, through said instant messaging system user interface, an indication from said local user of at least one file to be shared among said plurality of sharing users;

program code for generating, within said instant messaging system user interface, a display object enabling only one of said plurality of sharing users to check out said file at a time;

program code for allowing only said one of said plurality of sharing users having checked out said file to modify said file;

program code for distributing copies of said file to each of said plurality of sharing users to be stored as local copies of said file;

program code for allowing read access to said local copies of said file to ones of said sharing users not currently having said file checked out;

program code for distributing, to each of said plurality of sharing users, indications of whether said local copies of said file are currently up to date; and program code for displaying, within said list of shared files in said instant messaging system user interface, visual indications of whether local copies of said shared files in said list are currently up to date.

\* \* \* \* \*